United States Patent

Iijima

[15] 3,659,214

[45] Apr. 25, 1972

[54] PULSE REGENERATING CIRCUIT

[72] Inventor: Hiroshi Iijima, Tokyo, Japan

[73] Assignee: Nippon Electric Co., Ltd., Tokyo, Japan

[22] Filed: Sept. 16, 1970

[21] Appl. No.: 72,626

[30] Foreign Application Priority Data

Sept. 20, 1969 Japan....................................44/74998

[52] U.S. Cl. ...........................328/207, 307/247 R, 307/265, 307/273, 328/8, 328/92

[51] Int. Cl. ....................H03k 3/10, H03k 3/284, H03k 5/04

[58] Field of Search..................307/214, 215, 217, 235, 247, 307/273, 268, 265, 283, 289, 290, 291; 328/150, 151, 195, 196, 200, 204, 206, 207

[56] References Cited

UNITED STATES PATENTS 3,349,255 10/1967 McAvoy ............................307/283 X
3,480,801 11/1969 Smith..................................307/273 X
3,532,993 10/1970 Kennedy............................307/273 X
3,294,983 12/1966 Draper, Jr...........................307/273 X
3,051,852 8/1962 Mintz et al.........................307/291 X
2,949,547 8/1960 Zimmermann .........................307/273
3,073,972 1/1963 Jenkins ..............................307/289 X
3,497,725 2/1970 Lorditch, Jr...........................307/273

*Primary Examiner*—Donald D. Forrer
*Assistant Examiner*—L. N. Anagnos
*Attorney*—Sandoe, Hopgood & Calimafde

[57] ABSTRACT

In a PCM regenerative pulse output circuit of the type having a bistable circuit coupled to an output amplifier, an inhibiting circuit including a charging circuit having a predetermined time constant supplies a signal to the output amplifier to terminate its conduction whenever the bistable circuit remains in the set state for greater than a predetermined period. In this manner, the output amplifier is automatically protected against possible damage resulting from excessive current flow.

10 Claims, 8 Drawing Figures

INVENTOR
Hiroshi Iijima
by
Sandoe, Hopgood & Calimafde
ATTORNEYS

INVENTOR
Hiroshi Iijima by

Sandoe, Hopgood & Calimafde
ATTORNEYS

PULSE REGENERATING CIRCUIT

This invention relates generally to pulse circuits, and, more particularly, to an output circuit for use in PCM repeater equipment of the type including a pulse regenerating circuit and a saturation switching type output amplifier coupled to an output transformer as its load.

PCM repeater equipment is operated to discriminate the presence and/or absence of a pulse in each time-slot of the transmitted pulse train and to regenerate at a correct time position a pulse train, having the same characteristics as the pulse train transmitted from the preceding repeater equipment, and then to transmit the regenerated output to the succeeding repeater equipment. The output circuit of the repeater equipment receives the output of the discriminator to discriminate between the presence and absence of a pulse, and regenerate a square-wave pulse having a predetermined amplitude and width only when the pulse is present. The regenerated pulse is sent to the transmission channel via an output transformer.

It is commonly indefinite whether the flip-flop is in the set side or in the reset side in its initial state when power is on. If its stands in the set side, the output amplifier remains in the conducting state, and an excessive current flows in the output amplifier due to the transformer load. This in some cases damages the output amplifier.

It is an object of the invention to provide a regenerative pulse output circuit of the type described in which the flow of excessive current in the output amplifier is reliably and automatically prevented. The pulse regenerator circuit of the invention includes a flip-flop and a saturation switching type output amplifier coupled to an output transformer as its load. A time constant circuit formed by a capacitor and a resistor is utilized to obtain an integrated output of time lapse after the flip-flop has turned to the set state, whereby the set state of the flip-flop is monitored. An inhibiting circuit supplies a signal to the output amplifier to terminate its conducting state when the flip-flop stays in the set state for over a predetermined period of time, to thereby automatically and securely protect the output amplifier from being damaged as a result of excessive current flow.

To the accomplishment of the above and to such further objects as may hereinafter appear, the present invention relates to a pulse generating circuit substantially as defined in the appended claims and as described in the accompanying specification taken together with the accompanying drawings in which:

Figure 1:
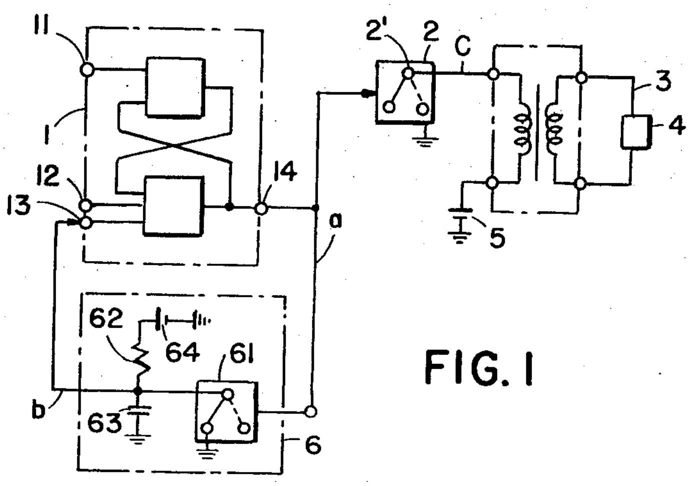
FIG. 1 is a block diagram illustrating the principles of this invention.

In the circuit of FIG. 1 a bistable circuit 1 such as a flip-flop has a set input terminal 11, a first reset terminal 12, a second reset terminal 13, and an output terminal 14. An output amplifier 2 of the saturation switching type has a terminal 2′ coupled to the primary winding of output transformer 3. An impedance of a cable designated 4 is coupled across the secondary winding of transformer 3, and power source 5 supplies current to the primary winding of output transformer 3. The output amplifier 2 is controlled by the output of bistable circuit 1 so that the upper side terminal of output transformer 3 is opened as indicated by the solid line arrow when bistable circuit 1 is in the reset state, and is grounded as indicated by the broken line arrow when circuit 1 is in the set state. In the latter case, DC current is supplied to the primary winding of output transformer 3 from the power source 5.

According to this invention, an inhibiting circuit 6 is coupled to circuit 1 and amplifier 2 and includes a switching circuit 61 of saturation switching type which is controlled by the output of bistable circuit 1. The output terminal of switching circuit 61 is grounded as indicated by the solid line arrow in the reset state, and is opened in the set state, as indicated by the broken line. A time constant circuit coupled to switching circuit 61 is formed of a resistor 62 and a capacitor 63. The output of this time constant circuit, namely the voltage charged across the capacitor 63 from a power source 64, is connected to reset input terminal 13 of bistable circuit 1.

Figure 2:
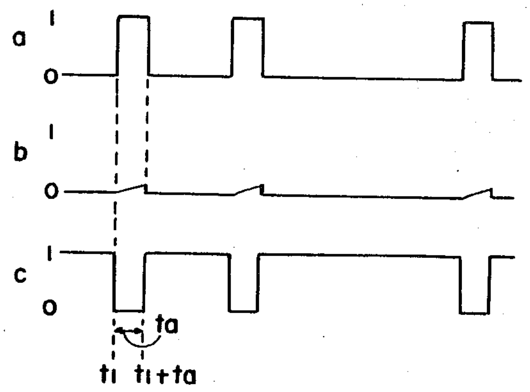
FIGS. 2 and 3 are diagrams showing the waveforms at various points of the circuit shown in FIG. 1.
Figure 3:
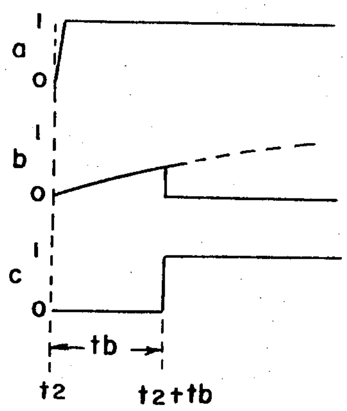

FIGS. 2 and 3 are waveform diagrams showing the operation of the circuits shown in FIG. 1; the voltage waveform at the output terminal 14 is indicated by $a$, the charging voltage waveform at capacitor 63 is indicated by $b$, and the voltage waveform at the terminal 2′ of output amplifier 2 is indicated by $c$. The output of the discriminator (not shown in FIG. 1) which serves to discriminate between the presence and absence of an input pulse is applied to terminal 11 of bistable circuit 1. The bistable circuit 1 is set only when the input pulse is present, and is then reset when the reset input terminal 12 receives a timing pulse having a certain definite delay time ($t_a$) behind the set time. By doing this, a square-wave pulse having a pulse width $t_a$ (FIG. 2$a$) is regenerated from the output of bistable circuit 1, and one of the terminals of the primary winding of output transformer 3 is grounded by the switching element of output amplifier 2 only for a period of $t_a$. As a reesult, a current corresponding to impedance 4 of the cable is supplied to the output transformer from power source 5, and the regenerated pulse is sent out over the cable.

In this circuit, if bistable circuit 1 is brought to the set time in its initial state when power is on, output amplifier 2 may be damaged. To solve this problem in accord with the invention, inhibiting circuit 6 is provided. When bistable circuit 1 is brought to the set state in the power-on state, switching circuit 61 is opened, the current supplied from power source 64 via resistor 62 charges capacitor 63, and the voltage across that capacitor gradually increases from an initial level of OV by being charged at the time constant $C_{63}R_{62}$ ($=\tau$), where $C_{63}$ denotes the capacitance of capacitor 63, and $R_{62}$ denotes the resistance of resistor 62. When the capacitor voltage reaches the reset level of bistable circuit 1 after a certain period of time, bistable circuit 1 is automatically reset and, at the same time, the switching element of output amplifier 2 is brought to the non-conductive state.

When pulse regeneration is normally operated, bistable circuit 1 returns to the set state at time $t_1$ in FIG. 2, and pulse regeneration is initiated. At the same time, the voltage across capacitor 63 gradually increases from OV. However, bistable circuit 1 is reset at time ($t_1+t_a$), and capacitor 63 is short-circuited to ground by switching circuit 61. As a result, the voltage across capacitor 63 returns quickly to OV. During pulse regeneration, the voltage across capacitor 63 is below a certain definite and sufficiently small value determined by the pulse width $t_a$ of the regenerated pulse. Accordingly, this capacitor voltage does not serve to affect the operation of bistable circuit 1.

Figure 4:
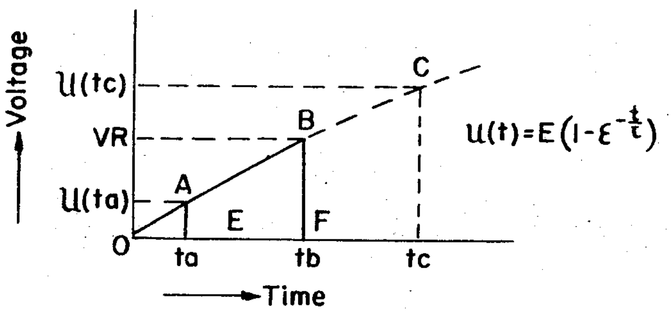
FIG. 4 is a diagram illustrating the operation of the inhibiting circuit.

FIG. 4 is a diagram illustrating in detail the operation of inhibiting circuit 6. The time point at which bistable circuit 1 returns to the reset state is considered as the origin of the time points with respect to the voltage across capacitor 63. When bistable circuit 1 changes to the set state, the voltage $u(t)$ across capacitor 63 is expressed as a function of time lapse $t$ after the bistable circuit has changed to the set stage; the voltage $u(t)$ given by the following equation:

$$u(t)=E(1-\epsilon^{-\frac{t}{\tau}})$$

where $E$ is the voltage of the DC power source 6. As shown in FIG. 4, the voltage $u(t)$ is plotted along O → A → B → C. When the bistable circuit turns into the set state for normal pulse regenerating operation, the voltage $u(t)$ will undergo a variation along the curve O → A → E. While, when the bistable circuit is brought to the set state in its initial state at power turn on, the bistable circuit will not be reset at time $t_a$, and the voltage $u(t)$ will increase until it reaches the reset level $V_R$ of the bistable circuit at time $t_b$, at which time the bistable circuit is reset. As a result, the voltage u(t) in this situation undergoes the change along the path O → A → B → F. Assuming that the period of time during which bistable circuit 1 returns to the set state and the output transformer loses its transformation function is $t_c$, the relationship $$u(ta) < V_R < u(t_c)$$

holds. How, when the time constant $\tau$ is determined as $$\frac{t_a}{-\log_e\left(1-\frac{V_R}{E}\right)} < \tau < \frac{t_c}{-\log_e\left(1-\frac{V_R}{E}\right)}$$

it then becomes possible to automatically prevent the output amplifier from being damaged without affecting normal regenerating operation of the circuit. Generally, $t_c$ is several times larger than $t_a$ and, hence, the values of capacitor 63 and resistor 62 (by which the time constant $\tau$ is determined) may have relatively large deviations.

Figure 5:
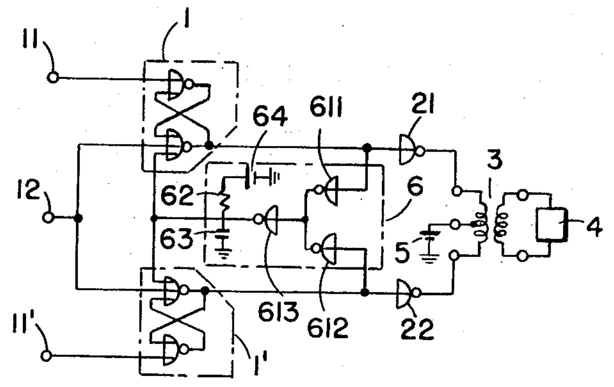
FIG. 5 is a circuit diagram of a first embodiment of this invention.

FIG. 5 illustrates the first embodiment of the invention wherein an output circuit using resistor transistor logic (RTL) NOR gates is employed. This output circuit is a bipolar pulse regenerator circuit using two pairs of flip-flops 1 and 1' and output amplifiers. When the bistable circuit changes to the set state, NOR gate 611 becomes conducting, and when flip-flop 1' turns to the set state, NOR gate 612 becomes conducting. Therefore, the NOR gate 613 is opened when either one of the flip-flops 1 and 1' turns to the set state, and thus the states of flip-flops 1 and 1' can be monitored in common by the time constant circuit. In this embodiment, the NOR gates 21 and 22 coupled respectively to flip-flops 1 and 1' correspond to the output amplifier 2 shown in FIG. 1.

Figure 6A:
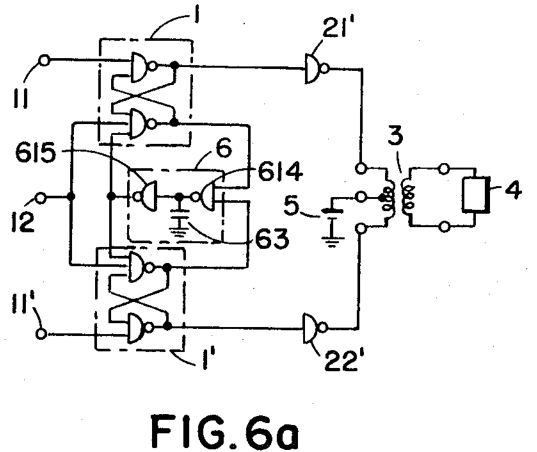
FIG. 6 is a circuit diagram of a second embodiment of the invention.
Figure 6B:
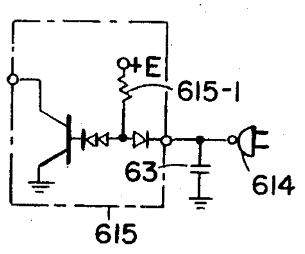

FIG. 6a is a schematic diagram showing a second embodiment of the invention wherein the output circuit is formed by the use of a known NAND circuit of diode transistor logic (DTL). This output circuit is a bipolar pulse regenerator circuit using two pairs of flip-flops 1 and 1' and output amplifiers 21' and 22'. The output amplifiers are respectively controlled by the output of the set side of the flip-flops. The outputs of the reset side of flip-flops 1 and 1' are connected to the input gate of NAND circuit 614. NAND gate 614 is opened when either of the flip-flops turns to the set state. The NAND gate 615 coupled to the output of NAND gate 614 changes the polarity of the inhibiting output, and serves to reset the individual flip-flops by inhibiting circuit 6. The resistor 615–1 included in the NAND gate 615 as shown in FIG. 6b can be used for the resistor of the time constant circuit and, accordingly, no resistor need be connected in series to the capacitor in this embodiment.

Figure 7:
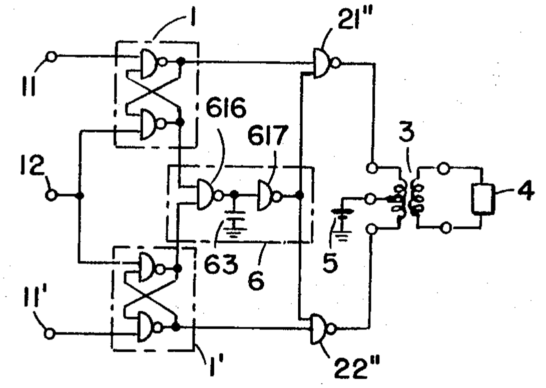
FIG. 7 is a circuit diagram showing a third embodiment of the invention.

FIG. 7 is a diagram showing a third embodiment of the invention wherein the output circuit is formed by the use of DTL NAND gates. This output circuit is a modification of the embodiment shown in FIG. 6. The output of inhibiting circuit 6 including NAND gates 616 and 617 is applied to the inputs of NAND gates 21' and 22'' which operate as the output amplifiers. When the flip-flop in its initial state is brought to the set state, the associated output amplifier is turned to the non-conductive state directly by the inhibiting output after a certain period of time, leaving the flip-flop in the set state. In this embodiment, the output amplifier can securely be protected from damage regardless of the condition under which the flip-flop remains in its set state (for example, the condition that the set input is artificially fixed to the set state when checking the repeater equipment).

A few embodiments of the invention have been described above. In short, the inhibiting circuit of this invention always monitors the continuation time of the set state of the bistable circuit and, if the set state continues for a certain definite period of time, the inhibiting circuit delivers an inhibiting output to inhibit conduction of the output amplifier. To this effect, the circuit of this invention can be effectively operated not only when power is on but also after power is on, and even when the bistable circuit turns to the set state due to an external noise signal introduced into the transmission channel.

The advantageous features of the invention can now be summarized:

1. In a circuit having flip-flops in combination with an output amplifier of an output transformer load, the output amplifier can be automatically and securely protected from damage on the occasion of power turn on or excessive external noise.

2. One inhibiting circuit can be used in common even when many pairs of bistable circuits and output amplifiers (such as bipolar pulse regenerator circuits) are used.

3. Since the resistor and capacitor which determine the time constant of the inhibiting circuit may have a deviation of about ±50 percent, the freedom of circuit design is extended. For the capacitor, a super-miniaturized chip capacitor or a thin film capacitor whose characteristic dispersion is large may be used.

4. The output circuit of this invention, excepting the output transformer, can be formed by integrated circuit techniques.

These features make this invention highly useful when applied to PCM repeater equipment which must be miniaturized and of high reliability.

Thus while only several embodiments of the present invention have been herein specifically described, it will be apparent that modifications may be made therein without departing from the spirit and the scope of the invention.

I claim:

1. A pulse regenerating circuit comprising a bistable circuit, an output circuit having first switching means coupled to the bistable circuit operating in a conductive state in response to one stable state of said bistable circuit and in a non-conductive state in response to the other stable state of said bistable circuit, an inhibiting circuit having second switching means coupled to said bistable circuit operating in a non-conductive state in response to said stable state of said bistable circuit and in a conductive state in response to said other stable state of said bistable circuit, said bistable circuit comprising first and second flip flops, said first switching means comprising first and second NOR gates, and said second switching means comprising third, fourth, and fifth NOR gates, the inputs of said first and third gates and the inputs of said second and fourth gates being coupled respectively to the output terminals of said first and second flip-flops, the outputs of said third and fourth gates being coupled to the input of said fifth gate, the output of said fifth gate being coupled to a reset terminal of said first and second flip-flops, charging means coupled to said second switching means, means for charging said charging means by controlling said second switching means only when said bistable circuit is in said one stable state, an output transformer coupled to said first switching element for producing a regenerative pulse having a pulse width of a ta when said first switching element is in its said conducting state, and wherein the time constant $\tau$ of said charging means is determined by $$\frac{t_a}{-\log_e\left(1-\frac{V_R}{E}\right)} < \tau < \frac{t_c}{-\log_e\left(1-\frac{V_R}{E}\right)}$$

where $E$ is the magnitude of said voltage source, $V_R$ is the reset voltage of said bistable circuit, and $t_c$ is the time during which said bistable circuit returns to its said one state and said output transformer loses its said transformation function, and means responsive to a predetermined voltage developed across said charging means for terminating the conduction of said first switching means.

2. The circuit of claim 8, in which said charging means comprises a voltage source and a capacitance element coupled to said voltage source and said second switching element, the latter being effective when in its said conductive state to short circuit said capacitance element.

3. The circuit of claim 2, in which said charging means when said predetermined voltage is charged thereacross is effective also to reset said bistable circuit to the other of its stable states.

4. The circuit of claim 1, in which said charging means when said predetermined voltage is charged thereacross is effective also to reset said bistable circuit to the other of its stable states.

5. A pulse regenerating circuit comprising a bistable circuit, an output circuit having first switching means coupled to the bistable circuit operating in a conductive state in response to one stable state of said bistable circuit and in a non-conductive state in response to the other stable state of said bistable circuit, an inhibiting circuit having second switching means coupled to said bistable circuit operating in a non-conductive state in response to said stable state of said bistable circuit and in a conductive state in response to said other stable state of said bistable circuit, said bistable circuit comprising first and second flip-flops, said first switching means comprising first and second NAND gates connected respectively to one output terminal of said first and second flip-flops, said second switching means comprising third and fourth NAND gates, the inputs to said third NAND gate being connected respectively to the other output terminal of said first and second flip-flops, the input of said fourth gate being coupled to the output of said third gate, the output of said fourth gate being coupled to the reset terminals of said first and second flip-flops, charging means coupled to said second switching means, means for charging said charging means by controlling said second switching means only when said bistable circuit is in said one stable state, an output transformer coupled to said first switching element for producing a regenerative pulse having a pulse width of *ta* when said first switching element is in its said conducting state, and wherein the time constant $\tau$ of said charging means is determined by $$\frac{t_a}{-\log_e\left(1-\frac{V_R}{E}\right)}<\tau<\frac{t_c}{-\log_e\left(1-\frac{V_R}{E}\right)}$$

where $E$ is the magnitude of said voltage source, $V_R$ is the reset voltage of said bistable circuit, and $t_c$ is the time during which said bistable circuit returns to its said one state and said output transformer loses its said transformation function, and means responsive to a predetermined voltage developed across said charging means for terminating the conduction of said first switching means.

6. The circuit of claim 5, in which said charging means comprises a voltage source and a capacitance element coupled to said voltage source and said second switching element, the latter being effective when in its said conductive state to short circuit said capacitance element.

7. The circuit of claim 5, in which said charging means when said predetermined voltage is charged thereacross is effective also to reset said bistable circuit to the other of its stable states.

8. A pulse regenerating circuit comprising a bistable circuit, an output circuit having first switching means coupled to the bistable circuit operating in a conductive state in response to one stable state of said bistable circuit and in a non-conductive state in response to the other stable state of said bistable circuit, an inhibiting circuit having second switching means coupled to said bistable circuit operating in a non-conductive state in response to said stable state of said bistable circuit and in a conductive state in response to said other stable state of said bistable circuit, said bistable circuit comprising first and second flip-flops, said first switching means comprising first and second NAND gates coupled respectively to one output terminal of said first and second flip-flops, said second switching means comprising a third NAND gate having inputs coupled to the other output terminals of said first and second flip-flops, and a fourth NAND gate having an input coupled to the output of said third gate and an output coupled to another input of said first and second gates, charging means coupled to said second switching means, means for charging said charging means by controlling said second switching means only when said bistable circuit is in said one stable state, an output transformer coupled to said first switching element for producing a regenerative pulse having a pulse width of ta wen said first switching element is in its said conducting state, and wherein the time constant $\tau$ of said charging means is determined by $$\frac{t_a}{-\log_e\left(1-\frac{V_R}{E}\right)}<\tau<\frac{t_c}{-\log_e\left(1-\frac{V_R}{E}\right)}$$

where $E$ is the magnitude of said voltage source, $V_R$ is the reset voltage of said bistable circuit, and $t_c$ is the time during which said bistable circuit returns to its said one state and said output transformer loses its said transformation function, and means responsive to a predetermined voltage developed across said charging means for terminating the conduction of said first switching means.

9. The circuit of claim 8, in which said charging means comprises a voltage source and a capacitance element coupled to said voltage source and said second switching element, the latter being effective when in its said conductive state to short circuit said capacitance element.

10. The circuit of claim 8, in which said charging means when said predetermined voltage is charged thereacross is effective also to reset said bistable circuit to the other of its stable states.

* * * * *